(12) United States Patent
Palberg et al.

(10) Patent No.: US 10,850,949 B2
(45) Date of Patent: Dec. 1, 2020

(54) REMOTE CONTROL DEVICE FOR A CRANE, A CONSTRUCTION MACHINE AND/OR FOR A PALLET TRUCK

(71) Applicant: Liebherr-Components Biberach GmbH, Biberach an der Riss (DE)

(72) Inventors: Michael Palberg, Riedlingen (DE); Jürgen Resch, Degernau (DE); Oliver Fenker, Warthausen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 197 days.

(21) Appl. No.: 16/155,534

(22) Filed: Oct. 9, 2018

(65) Prior Publication Data
US 2019/0039862 A1 Feb. 7, 2019

Related U.S. Application Data

(63) Continuation of application No. PCT/EP2017/000460, filed on Apr. 7, 2017.

(30) Foreign Application Priority Data

Apr. 8, 2016 (DE) .................... 20 2016 002 295 U (51) Int. Cl.
*B66C 13/40* (2006.01)
*B66C 13/54* (2006.01)
(Continued)

(52) U.S. Cl.
CPC ............. *B66C 13/40* (2013.01); *B66C 13/46* (2013.01); *B66C 13/54* (2013.01); *E02F 9/166* (2013.01);
(Continued)

(58) Field of Classification Search
CPC .......... B66C 13/40; B66C 13/54; E02F 9/166; E02F 9/2004; E02F 9/205; E02F 9/264; G09B 9/05; G09B 9/165
See application file for complete search history.

(56) References Cited

U.S. PATENT DOCUMENTS 3,557,304 A * 1/1971 Rue ..................... G05D 1/0038
348/114
4,884,137 A 11/1989 Hanson et al.
(Continued)

FOREIGN PATENT DOCUMENTS

CN 201172591 Y 12/2008
CN 201864485 U 6/2011
(Continued)

OTHER PUBLICATIONS

Langen, I. et al., "Simulation of Dynamic Behaviour of a FPSP Crane," Stavanger University College, 2003. URL: http://www.trac.no/download/crane_paper.pdf (Dec. 12, 2016).

*Primary Examiner* — Donald J Wallace
(74) *Attorney, Agent, or Firm* — Levine Bagade Han LLP (57) ABSTRACT

The present invention relates to a remote control device for a crane, for a construction machine and/or for a pallet truck comprising a control station that has at least one input means for inputting control commands and that has a signal transmission device for transmitting the input control commands to the control apparatus of the crane, of the construction machine, or of the pallet truck; and a display apparatus for displaying a representation of the machine surroundings and/or of a piece of working equipment such as a boom or a lifting hook, wherein a movement determination unit is provided for determining movements and/or deformations of the machine components in dependence on the input control commands. It is proposed to present crane reactions or machine reactions to control commands input at the
(Continued)

control station, for example in the form of crane movements and/or of crane deformations not only in the form of a representation on the display apparatus, but to convert them into an actual movement of the control station of the remote control accompanying the crane reaction or machine reaction to allow the remote control user to have the dynamic machine reactions communicated to him more realistically and to experience them more realistically.

20 Claims, 2 Drawing Sheets (51) Int. Cl.
*E02F 9/16* (2006.01)
*E02F 9/20* (2006.01)
*E02F 9/26* (2006.01)
*B66C 13/46* (2006.01)
*G09B 9/05* (2006.01)
*G09B 9/16* (2006.01)

(52) U.S. Cl.
CPC ............ *E02F 9/2004* (2013.01); *E02F 9/205* (2013.01); *E02F 9/264* (2013.01); *G09B 9/05* (2013.01); *G09B 9/165* (2013.01)

(56) References Cited

U.S. PATENT DOCUMENTS

| | | | |
|---|---|---|---|
| 9,741,169 B1* | 8/2017 | Holz | G06F 3/011 |
| 2003/0224333 A1 | 12/2003 | Vastvedt | |
| 2012/0232763 A1* | 9/2012 | Mizuochi | B66C 23/905 701/50 |
| 2013/0345857 A1* | 12/2013 | Lee | B66C 13/48 700/229 |
| 2014/0111648 A1* | 4/2014 | Ishimoto | B60R 1/00 348/148 |
| 2015/0321758 A1* | 11/2015 | Sarna, II | B64C 39/024 244/63 |
| 2016/0048203 A1* | 2/2016 | Blum | G02B 27/0101 104/84 |
| 2016/0083115 A1* | 3/2016 | Hess | B64C 39/022 701/3 |
| 2016/0255301 A1* | 9/2016 | Vadura | H04N 5/64 348/839 |
| 2016/0292933 A1* | 10/2016 | Sprock | G07C 5/008 |
| 2016/0321763 A1* | 11/2016 | Shike | G06Q 10/06313 |
| 2016/0348504 A1* | 12/2016 | Hanski | E21C 29/22 |
| 2017/0121938 A1* | 5/2017 | Yamada | E02F 9/2012 |
| 2018/0240329 A1* | 8/2018 | Steinmetz | H05K 5/0017 |
| 2019/0094890 A1* | 3/2019 | Qian | B64C 39/024 |

FOREIGN PATENT DOCUMENTS

| | | | |
|---|---|---|---|
| CN | 103871291 | 6/2014 | |
| CN | 104302848 | 1/2015 | |
| DE | 102010016113 | 9/2011 | |
| DE | 102012216489 | 3/2014 | |
| DE | 102013011818 | 1/2015 | |
| DE | 102014218749 | 3/2016 | |
| JP | 2013-116773 | 6/2013 | |
| WO | WO 2015/155845 | 10/2015 | |
| WO | WO 2015/155878 | 10/2015 | |
| WO | WO-2016053220 A1 * | 4/2016 | ............ B66C 13/40 |
| WO | WO 2017/121636 | 7/2017 | |
| WO | WO 2017/121639 | 7/2017 | |
| WO | WO 2017/174205 | 10/2017 | |

* cited by examiner

REMOTE CONTROL DEVICE FOR A CRANE, A CONSTRUCTION MACHINE AND/OR FOR A PALLET TRUCK

CROSS-REFERENCE TO RELATED APPLICATIONS

This application is a continuation of International Application No. PCT/EP2017/000460, filed Apr. 7, 2017, which claims priority to German Utility Model Application No. 20 2016 002 295.5, filed Apr. 8, 2016, both of which are incorporated by reference herein in their entireties.

BACKGROUND

The present invention relates to a remote control device for a crane, for a construction machine and/or for a pallet truck comprising a control station that has at least one input means for inputting control commands and that has a signal transmission device for transmitting the input control commands to the control apparatus of the crane, of the construction machine, or of the pallet truck; and a display apparatus for displaying a representation of the machine surroundings and/or of a piece of working equipment such as a boom or a lifting hook, wherein a movement determination unit is provided for determining movements and/or displacements of the machine components in dependence on the input control commands.

Cranes and similar large units such as piling and drilling rigs, surface miners, or cable-operated excavators are very complex in operation and control. In this context, it is not only the plurality of control functions and their interactions as well as the accompanying input means which are quite complex as a whole such as joysticks, foot pedals, and control switches that are a problem, but also the often unaccustomed, machine-specific reactions of the machine structure to movements of the actuating drives. Cranes such as revolving tower cranes or telescopic luffing cranes, but also harbor cranes or maritime cranes, have long, slim structural components such as boom structures or tower structures that twist and are relatively soft so that structural deformations and oscillating movements that serve as a kind of feedback for the control actuation for experienced crane operators accompany acceleration or deceleration procedures of the actuating drives. Unlike with small units having structures that can be assumed to be approximately rigid, deformations of the tower structure and of the boom system can occur, for example with revolving tower cranes, if a load is taken up or the load can continue to oscillate about the upright axis on rotation and the boom can accordingly continue to swing in a rotational manner. Similar can occur with cable-operated excavators or piling and drilling rigs so that a crane operator or a machine operator becomes unsure if he does not here experience the typical crane reactions with respect to control procedures.

Such missing crane reactions and a lack of realism in general are in particular a problem in the remote control of cranes and construction machinery or pallet trucks, said problem making the remote controlling machine operator uncertain. If, for example, a crane is remote controlled, the remote operator often does not feel the typical crane reactions that intuitively give him the feeling on a direct control in the crane operator's cab of having controlled correctly or incorrectly.

To make the remote control more realistic, it has already been considered to use an approximately realistic control station that can, for example, correspond to the crane operator's cab of a respective crane type and can have control commands via input means provided there such as joysticks, pedals, control switches, or touchscreens. In addition, a real or virtual representation of the crane surroundings and of the crane components visible from the control station such as the boom and the lifting hook is displayed on a display apparatus that can, as is known, comprise a plurality of screens that are arranged in the field of vision of the control station, with a "real" representation being able to be provided by cameras at the remote controlled machine and with the virtual representation of the crane surroundings and of the crane components being able to be calculated by a graphical simulation model in dependence on the input control commands.

A remote control system for a crane is known, for example, from document DE 10 2012 216 489 A1, wherein this already known remote control should be able to be used for work machines of different types. The remote control there is provided with a selection mechanism that permits the number of operation and selection menus of the display of the remote control to be reduced depending on the configuration in which the connected work machine is. There is, however, a lack of sufficient realism in the above-described manner in this remote control that is also hardly improved by the adaptation of the operation menu to the respective work machine.

A crane simulator that works with virtual representations of the crane surroundings is known, for example, from document DE 10 2013 011 818 A1. A crane operator's cab is provided there as a control station having corresponding input means, with the viewing windows or the glazing of the simulated crane operator's cab being replaced with screens on which the virtual representation of the crane surroundings is shown. The dynamic behavior of the control and drive components should here also be simulated and taken into account in the screen representation by a technical simulation module, with here the adjustment movements of crane components such as of the hoisting gear that occur on specific crane movements above all being shown.

SUMMARY

Starting from this, it is the underlying object of the present invention to provide an improved remote control device of the initially named type which avoids disadvantages of the prior art and further develops the latter in an advantageous manner. A more realistic simulation of the crane operation or of the machine operation should in particular be achieved that better communicates the actual crane behavior or machine behavior and that makes the remote control ability more reliable.

The named object is achieved in accordance with the invention by a remote control device in accordance with claim 1. Preferred embodiments of the invention are the subject of the dependent claims.

It is therefore proposed to present crane reactions or machine reactions to control commands input at the control station, for example in the form of crane movements and/or of crane deformations not only in the form of a representation on the display apparatus, but also to convert them into an actual movement of the control station of the remote control accompanying the crane reaction or machine reaction to allow the remote control user to have the dynamic machine reactions communicated to him more realistically and to experience them more realistically. The control station that can, for example, comprise an operator's seat is for this purpose no longer installed in a statically rigid manner in the space or at the floor, but is rather movable in space by a drive apparatus. In accordance with the invention, the control station of the remote control device is movably supported and is movable by a drive apparatus in dependence on the movements determined by the movement determination module and/or on the deformation of the machine components. If the movement determination module determines deflections of machine components such as of the crane tower due to adjustment movements or deformations that would have an effect on the position of the real crane operator's cab, the drive apparatus is correspondingly controlled by a drive control apparatus to simulate the movement of the crane operator's cab and to move the control station accordingly. If, for example, a command to rotate the crane about an upright axis is input at the control station, the control command is accordingly rotated about the upright axis by the drive apparatus. If, for example, the control command to hoist a heavy load is input, which can in reality result in a slight pitching of the crane structure with a slight twisting of the tower, the control station is traveled a little to the front and/or is tilted a little to the front by the drive apparatus.

To enable a simulation of the control station movements occurring in real operation that is as realistic as possible, the drive apparatus can be configured as movable in multiple axes and/or can perform both rotational and translational movements. The control station can in particular be movably supported in multiple axes and the drive apparatus can comprise at least one upright axis of rotation and at least one horizontal luffing axis and/or two horizontally aligned translation axes. To be able also to simulate complex control station movements, the drive apparatus can have three axes of rotation or of tilt or can be configured as working rotationally in three axes and as working translationally in three axes so that the control station can be rotated or tilted about all three spatial axes and can be translationally traveled in all three spatial directions. Depending on the crane type or machine type to be simulated, simpler configurations of the drive apparatus having fewer axes of movement can also be considered.

In an advantageous further development of the invention, the remote control device can be connected to different units, in particular to different unit types, and can build up control communication with the respective selected unit. Such units can in particular be different pieces of equipment used on a construction site such as cranes, excavators, crawler-type vehicles, or similar machines, but also units used at different locations. Depending on which unit is to be remote controlled, a control communication connection can be built up by the remote control device and/or by the respective unit, for example by selecting a respective IP address if the connection takes place via a network or also in a different manner. To enable sufficiently rapid data communication between the remote control and the machine, a communication link of high bandwidth is advantageously selected to avoid real time problems or a time delay between the control commands and the machine reactions.

To be able to map the machine reactions of different machine types realistically, the remote control device can, in a further development of the invention, have a configuration module by means of which the remote control device can selectively be preconfigured for a respective machine type to be remote controlled. Said preconfiguration means can in a manner known per se adapt the assignment of the control levers and control buttons as well as the selection of the actuation menus and screen representations to the respective unit. Preconfiguration means for the movement control and/or mapping of the machine reactions can, however, in particular also be provided by means of which the drive apparatus for moving the control station can be reconfigured and adapted to the machine reactions of the respective machine type since, for example, a top slewing revolving tower crane reacts differently than a bottom slewing revolving tower crane or in turn a telescopic luffing crane reacts differently than a revolving tower crane or an excavator reacts differently than a crane. Working parameters and/or marginal parameters of the movement determination module can in particular be reconfigured by means of said configuration means so that the movement determination module determines the movements and/or deformations of machine components matched to the respective machine type depending on the selected machine type. A realistic reaction of the control station can be generated by the control of the drive apparatus having the movement parameters adapted in such a manner.

The configuration module can furthermore also have preconfiguration means for adapting the display device and the representation of the machine surroundings and/or of the piece of working equipment thereupon reproduced, wherein said preconfiguration means can preferably adapt the representation and/or the display device to the cameras present or usable at the respective remote controlled machine type and/or, if the representation is virtually calculated, can adapt the parameters for the calculation of the virtual representation to the respective machine type.

Said movement determination module can generally have a different design. The movement determination module can, for example, detect real reactions of the remote controlled machine by means of a suitable sensor system, with corresponding sensor signals being able to be transmitted to the remote control to then actuate or control its control station accordingly. The detection of such real machine reactions of the remote controlled machine can, for example, include the detection of movements, for example the travel path of a trolley, the upward and downward play of a hoist rope of a crane, etc. Deformations of the structure of the remote controlled machine can, however, in particular also be detected, for example pitching movements of the crane operator's cab as a consequence of tower deformations, for example by means of corresponding inclinometers and/or accelerometers.

Alternatively or additionally to the detection of movements and/or deformations of the real remote controlled machine, the movement determination module can, however, also simulate said reactions to input control commands in the form of movements and/or deformations of machine parts and can have a corresponding simulation module for this purpose that calculates corresponding reaction movements and/or reaction deformations in dependence on the input control commands and/or can map and measure them with the aid of control components and/or movement components that belong to the simulation module. Such a simulation can avoid time offset problems between the control station of the remote control and the remote controlled machine, in particular with slower communication connections or with further distance paths.

If the remote control device can be used in the aforesaid manner for different machine types, the configuration module can adapt the calculation parameters and/or calculation algorithms for the simulation of the movements and/or deformations to the respective selected machine type. Dynamic packets or data sets and algorithm sets with respect to different machines to be remote controlled can in particular be read into the simulation module from a database to be able to simulate the movements and deformations suitably for the respective selected machine. The reading of said dynamic data packets can take place online from a database here. Alternatively or additionally, the simulation module itself can also be provided with a memory device in which different data sets and algorithm sets are stored in the manner of a library.

In a further development of the invention, mixed forms are also possible in which some of the reactions are detected at the real remote controlled machine and some other reactions are determined by the simulation module.

In accordance with a further aspect, the movement determination module is configured such that the crane structure or machine structure is not considered as a rigid structure, so-to-say as an infinitely stiff structure, but rather as an elastically deformable and/or yielding and/or relatively soft structure that permits movements and/or position changes due to deformations of the structural components—in addition to the adjustment movement axes of the machine such as of the boom luffing axis or of the tower slewing axis. The taking into account of the movability of the machine structure as a consequence of structural deformations under load or under dynamic loads is in particular of importance with elongated, slim, and deliberately maximized structures such as cranes with respect to the static and dynamic conditions—while taking account of the required safety properties—since here noticeable movement portions, for example for the crane operator's cab, but also the lifting hook position also occur due to the deformations of the structural elements. To be able to enable an actually realistic teaching or a realistic training here, the movement determination module takes account of such deformations of the machine structure under static or dynamic loads.

The determination device for determining such structural deformations can in particular comprise a calculation unit that calculates these structural deformations on the basis of a stored calculation model in dependence on the control commands entered at the control station. Such a model can have a similar structure to a finite element model or can be a finite element model, with advantageously, however, a model being used that is considerably simplified with respect to a finite element model and that can be determined empirically by a detection of structural deformations under specific control commands and/or load states at the actual crane or at the actual machine. Such a calculation model can, for example, work with tables in which specific deformations are associated with specific control commands, with intermediate values of the control commands being able to be converted into corresponding deformations by means of an interpolation apparatus.

The use of such a calculation model that is simplified with respect to a finite element model permits a determination of the structural deformations that is faster in time and thus a simulation of machine movements that is more realistic in real time or almost real time using less computing power.

The structural part deformations taken into account by the movement determination module can, on the one hand, be taken into account on the control of the drive apparatus for moving the control station so that the control station maps the control station movements occurring due to the structural part deformations.

Alternatively or additionally, determined or detected structural part deformations can also be taken into account in the representation of the machine surroundings and/or of the machine components visible therein, for example such that the deflection of the boom is shown in the representation or the horizon of the crane surroundings is traveled upwardly a little to map a slight frontward pitching of the crane operator's cab by a tower deformation, for example.

The representation of the machine surroundings and/or of the piece of working equipment of the remote controlled machine displayed at the control station can comprise a real representation that is provided by means of at least one camera that is provided in the region of the remote controlled machine and/or can also comprise a virtual representation that is calculated by means of a graphical simulation module in dependence on the input control commands.

Such a real camera generated representation of the machine surroundings and/or of the piece of working equipment can in particular be produced in the form of a live image or of a TV picture-like video image, wherein a corresponding video signal is transmitted from the at least one camera at the remote controlled machine to the remotely arranged control station of the remote control device and is reproduced by the display unit provided there.

Alternatively or additionally to a video camera or television camera, it is also possible to work with other imaging sensors, for example with an infrared sensor and/or a radar sensor and/or a photonic mixing detector and/or a time-of-flight sensor in the form of a time-of-flight detector in which measurement objects are illuminated by light pulses and the signal time of flight is measured on the basis of which the distance between the camera and the object can be calculated and a three-dimensional image can be generated. A plurality of imaging sensors of different image categories can advantageously also be used, for example a camera in conjunction with an infrared sensor, with its images being able to be superposed and displayed in a common image, for example such that the hot parts of an infrared image that can, for example, indicate persons are overlaid on the camera image. The use of a video camera and/or television camera is, however, advantageous to the extent that a realistic image is generated that communicates the feeling of seeing with his own eyes to the machine operator.

Such a camera or imaging sensor system for representing the machine surroundings or the piece of working equipment of the remote controlled machine can, for example, be fixedly or pivotably attached to the machine itself, for example to the crane operator's cab of a crane and/or to the trolley of a revolving tower crane or to another suitable position, with the camera advantageously being aligned such that the piece of working equipment, for example the lifting hook of a crane, can be observed. A plurality of cameras can advantageously also be provided here to be able to observe the piece of working equipment from different perspectives.

In an advantageous further development of the invention, a camera that is travelable and/or can be moved to different locations can be used that permits the piece of working equipment and/or the machine surroundings to be presented from different directions of view.

In a further development of the invention, a camera can in particular also be used that is mounted on an aerial drone. It is therefore proposed to use a remote-controlled aerial drone which is equipped with a camera and by means of which the desired camera image of the piece of working equipment and/or of the equipment surroundings can be provided from different directions of view. A perspective, camera image of the piece of working equipment and of its surroundings can in particular be provided from oblique viewing axes by means of such an aerial drone, with said oblique viewing axes being able to be acquired from a point spaced apart from the machine and its driver's cab and from above the ground so that the piece of working equipment and its environment can be made visible to the machine operator from a direction of view such as an external observer would also see. With a crane, camera images of the lifting hook and of its surroundings can be provided that look at the vertical center crane plane through the boom obliquely from the side or in a perpendicular manner. Images of the lifting hook can also be provided from drone positions that are disposed in this center crane plane passing through the boom. The relative positions between the piece of working equipment and its surroundings or a destination point can be visualized very much better by such perspective camera images from different viewing axes.

To enable a simple operation of the aerial drone, the aerial drone can be controlled in a further development of the invention in dependence on a machine position and/or on a position of a piece of working equipment such that the aerial drone also automatically follows machine movements, in particular movements of a piece of working equipment and at least approximately maintains or attempts to maintain and tracks a desired position relative to the machine and/or to its piece of working equipment on machine movements, in particular on movements of a piece of working equipment. If the aerial drone is used in conjunction with a crane, for example, the aerial drone can automatically follow the lifting hook of the crane with an activated automatic follow mode. If, for example, a relative position of the aerial drone at approximately the lifting hook height or a little above it is desired and set by the boom with a lateral spacing from the vertical center crane plane, the aerial drone can automatically lower or elevate its operating altitude when the lifting hook is lowered or raised and/or can fly forward or backward in parallel with the vertical center crane plane when the trolley of the crane is traveled and/or can fly laterally transversely to the left or right when the crane is rotated.

The aerial drone can, however, advantageously also be autonomously remote controlled such that different desired positions relative to the machine and/or to its piece of working equipment can be freely flown to by the aerial drone. This can, for example, take place by inputting a desired position for the aerial drone relative to the lifting hook or to the piece of working equipment, for example such that provision can be made that a position is input with respect to the lifting hook, for example in the form of "2 m above laterally to the right of the lifting hook" in a position control module that can be provided in the control station of the remote control device. Alternatively or additionally, however, the aerial drone can also be flown completely freely with respect to the machine and its piece of working equipment, for example with the aid of a joystick, to fly the aerial drone for so long until the camera position and its angle of view on the piece of working equipment and its surroundings satisfies the crane operator or machine operator.

To further increase the feeling of reality of the user of the remote control device, provision is made in accordance with a further aspect that the representations of the surroundings of the remote controlled machine provided by the camera and/or by the graphical simulation module are superposed on the display apparatus with live images from the control station that can, for example, show movements of the remote control device user. The real or virtual representations of the machine surroundings and/or of the machine components visible therein, on the one hand, and live images of a live camera recorded at the control stand, on the other hand, can in particular be shown simultaneously and superposed on the display apparatus. Such a superposition of images from the simulation world and live images gives the remote control device user a particularly strong feeling of realism.

A display apparatus wearable on the head, in particular in the form of eyeglasses, for example in the form of virtual reality glasses and a camera likewise advantageously wearable on the head, for example designed as a helmet camera or integrated in said virtual reality glasses can advantageously be used as a display apparatus for this purpose that provides said live images that are shown together with the artificially generated virtual representation on the display apparatus, in particular on the virtual reality glasses.

Said camera for the provision of the live images from the control station can advantageously be a stereoscopic camera that preferably provides stereoscopic images in a camera viewing direction at least approximately coinciding with the direction of view of the pair of eyes of a user, which stereoscopic images can be overlaid at a corresponding position of the display apparatus, in particular of the virtual reality glasses. A particularly realistic user feeling can hereby be achieved.

Alternatively or additionally, a 360° camera can also be used whose images of the surroundings can be provided to the crane operator, for example, in said virtual reality glasses. The design of the imaging system is also simplified by such a 360° camera; the camera image can in particular simply follow the head movement of the wearer of the virtual reality glasses, whereby a complex and/or expensive remote control of the camera can be avoided.

It would, however, generally be possible to superpose images of the remote controlled machine and said live images from the control station on a screen that is conventional per se, with here, for example, a user being able to wear a live image camera on the head that provides the images at least approximately corresponding to the direction of view of the user so that a user arm recorded live or the part of the control station recorded live can then be overlaid on the display apparatus, for example in the form of a plurality of screens. A more realistic and thus more impressive perceivable simulation can, however, be achieved by superposition on the visible surfaces of virtual reality glasses.

The superposition device for superposing the live images of the control station camera with the representation of the surroundings of the remote controlled machine can advantageously be configured as working in accordance with the so-called green screen technology, with the superposition device recognizing color areas of a predetermined color in the live image and then replacing these image regions with the virtual representation from the simulation module. The control station can advantageously comprise an operator's cab wall for this purpose in which window regions—for example, corresponding to the viewing windows of a real crane operator's cab—are colored in a key color that differs as much as possible from the remaining colors of the other components disposed in the field of view of the camera such as the color of the window frames, of the input means, and of the operator's clothing and skin color so that the live image recorded in the control station shows said colored areas in a specific color reproduction, while all the other image areas are shown in different colors. The live image areas or live image partial areas colored in said key color—green, for example—are then replaced with the real or virtual representation of the machine surroundings and/or of the machine components visible therein so that the superposed image or the superposed representation, on the one hand, shows the control station of the remote control device, its components and body parts of the user located in the field of view of the live camera live as a live image and, on the other hand, shows the camera generated real or virtual representation of the machine surroundings and of the machine components visible therein in the window regions of the operator cab wall recorded by the live camera.

Said virtual representation of the machine surroundings can advantageously be changed by the graphical simulation module and can be adapted to different scenarios in dependence on different data sets that can be imported into the simulation module via an interface. Planning data such as CAD data of a structure to be built and/or actual data of a construction site that reproduce the actual status of a building or structure being built in dependence on the construction progress can in particular be imported into the simulation module via a corresponding data interface and can be used by the simulation module to generate or adapt the virtual representation of the machine surroundings in accordance with the imported data set, in particular in dependence on the imported planning data and/or the actual data of the construction site.

Said information on the construction site or structure can, in the aforesaid manner, be CAD data or other geometrical data of the structure or of the construction site, with optionally digital image data also being able to be used that reproduce the actual structure and its construction progress. Such image data can be imported into the graphical simulation module as machine surroundings data on said CAD interface or a suitable image data interface, said graphical simulation module then adapting the virtual representation to these taken over CAD data and/or image data.

The modeling of a planned or already existing or partly completed construction site and the corresponding generation of the virtual representation of the machine surroundings by the graphical simulation module is in particular also a valuable resource to ensure the logistics on a construction site and also already to be able to simulate and practice critical routines before the start of construction.

If the movement determination device—also—works with simulated data in the aforesaid manner, the remote control device can advantageously not have all the movement parameters required for the movement simulation by a simulation processor, but can rather determine them at least in part by way of data emulation using actually moving hardware components that can form elements of the remote control device. Such a data emulation module of the remote control device can in particular comprise adjustment drive components and/or power electronic components by means of which adjustment movements are actually carried out that simulate the real crane movements or machine movements and provide data characterizing these movements, for example in the form of sensor signals that reproduce the adjustment movements of said drive components. Movement parameters and/or position parameters that can then be used further for the movement simulation can be provided much faster and with less processing power by such a data emulation, which permits a more realistic simulation in real time or almost in real time.

In particular time offset problems and data transmission problems can be avoided by means of such a data emulation that occur with communication channels having smaller bandwidths such as would otherwise occur if all the movements and/or deformations of the remote controlled machine that occur in dependence on the input control commands have to be detected at the real machine and then transmitted back to the control station of the remote control device.

To achieve a particularly fast, realistic determination of movements of the machine components in dependence on the control commands input at the control station, said movement determination module can be configured in accordance with a further aspect as a hybrid device or as a hybrid module that comprises, on the one hand, a processor for simulating movement parameters and/or position parameters and, on the other hand, hardware components such as drive units, rotary encoders, or frequency inverters which are at least similar to the real crane adjustment drives or machine adjustment drives and by means of which adjustment movements are simulated and movement parameters and/or position parameters are determined. "Real" hardware components are in particular used that are also installed as adjustment drive elements and/or control apparatus elements in the crane to be simulated or in the machine to be simulated.

The movement determination module can in particular comprise the switch cabinet or at least some of the switch cabinet and its components that is/are also used in the machine to be simulated and there form(s) a part of the machine control. The power electronics and/or at least some of the power electronics such as a frequency inverter can in particular be used to simulate the adjustment movements that are triggered by control command inputs at the control station.

Furthermore, in a further development of the invention, adjustment drive units, for example in the form of servo motors, can be used that serve the emulation of the adjustment drive movements of the machine or machine components to be simulated. A drive unit, for example in the form of a servo drive unit that is controlled—in particular via the aforesaid frequency inverter—in accordance with a control command is advantageously used here for a respective adjustment drive axis and can further advantageously be coupled to a further drive unit, for example in the form of a servo drive unit, by means of which a counter-torque and/or a counter-load can be exerted to simulate actually occurring loads, resistances, or inertia values. A load can, for example, be simulated by means of said second drive unit that counteracts a hoisting gear; or a winch torque can be simulated that counteracts a slewing gear drive.

The adjustment movement of the first-named drive unit optionally performed while taking account of the applied counter-torque or of the applied counter-load can be detected by a suitable detection device, with a corresponding detection signal reproducing the actually achieved adjustment movement and being able to be used as a sensor signal in the further simulation, in particular to determine movements and/or positions and/or deformations of the structural parts in the aforesaid manner and/or to simulate the virtual representation of the machine surroundings and/or of the machine components visible therein.

A plurality of such drive units or a plurality of such drive unit pairs comprising a drive and a counter-load drive as well as a respectively associated detection device are advantageously used to be able to determine the different adjustment movement axes and the adjustment movements of the machine operation to be simulated performed with respect thereto.

The sensor values of the drive units of the adjustment movement axes that are actuated and moved in dependence on the control commands input at the control station are therefore not simulated or calculated by means of a mathematical model in accordance with a further aspect, but are rather emulated or simulated with reference to hardware components that come as close as possible to the real adjustment drive components of the machine to be simulated and are output directly as actual sensor values.

The movement determination module can determine movements and/or positions of the machine components a great deal faster and with less processing power due to such a data emulation system so that the virtual representation of the machine surroundings and/or of the machine components and also the accompanying adjustment movements of the machine station can be achieved a great deal faster and more realistically. In addition, the generated sensor signals can be displayed at the control station and/or can be used for further monitoring measures such as the payload monitoring or the working range limitations that can be displayed and/or simulated at the control station.

If the remote control device is used for remote controlling a revolving tower crane and its operation, the aforesaid drive unit pairs for carrying out the corresponding adjustment movements and for providing the corresponding counter-torque or counter-load can in particular correspond to the tower slewing gear—or with a top slewer to the boom slewing gear—to the hoisting gear, and to the trolley mechanism.

BRIEF DESCRIPTION OF THE DRAWINGS

The invention will be explained in more detail in the following with reference to a preferred embodiment and to associated drawings. There are shown in the drawings.

DETAILED DESCRIPTION

Figure 1:
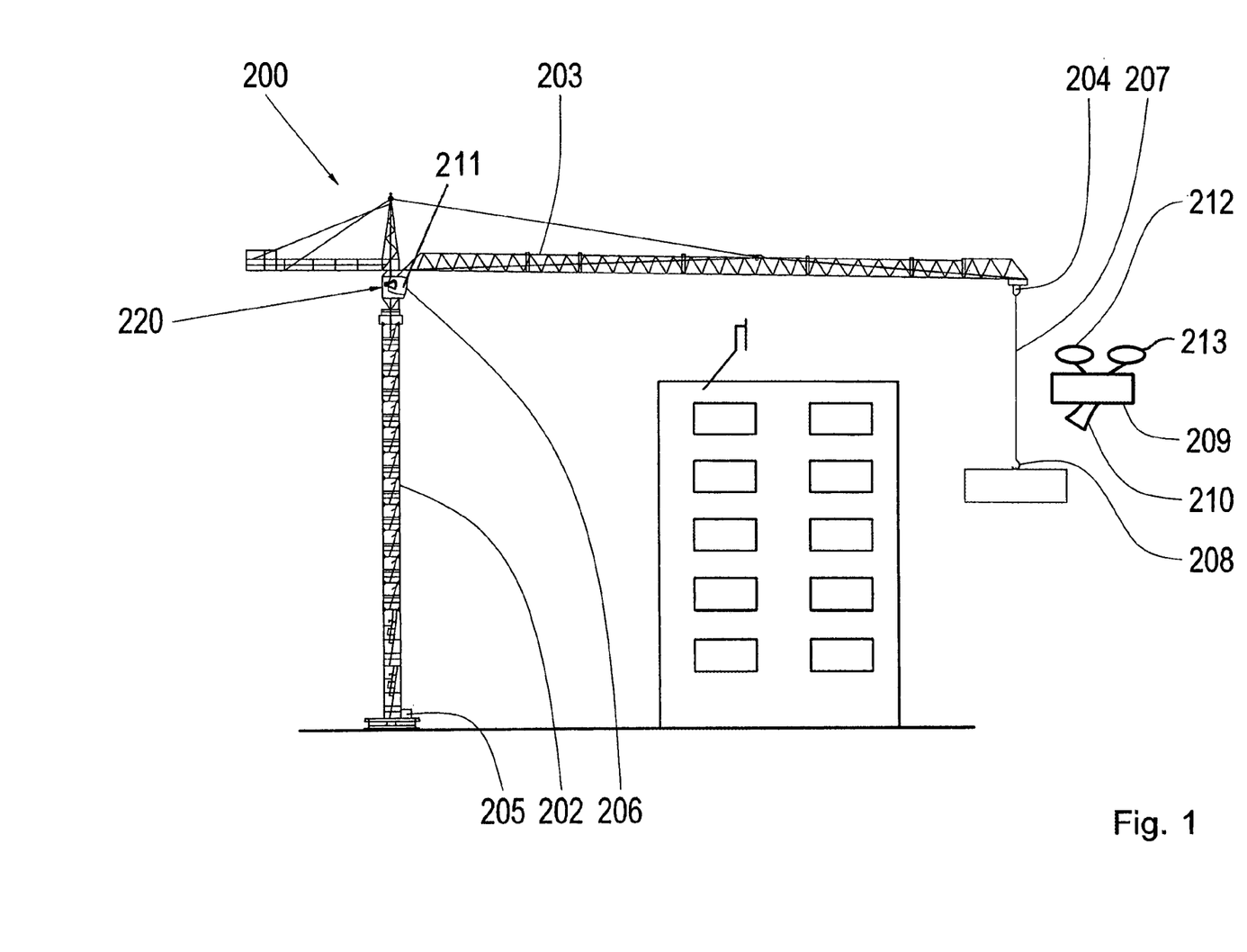
FIG. 1: a schematic representation of a remote controlled crane in the form of a revolving tower crane whose lifting hook maneuvers a load in a non-visible region behind a building, with an aerial drone having a camera observing the lifting hook to transmit a corresponding camera image to the control station of the remote control device.
Figure 2:
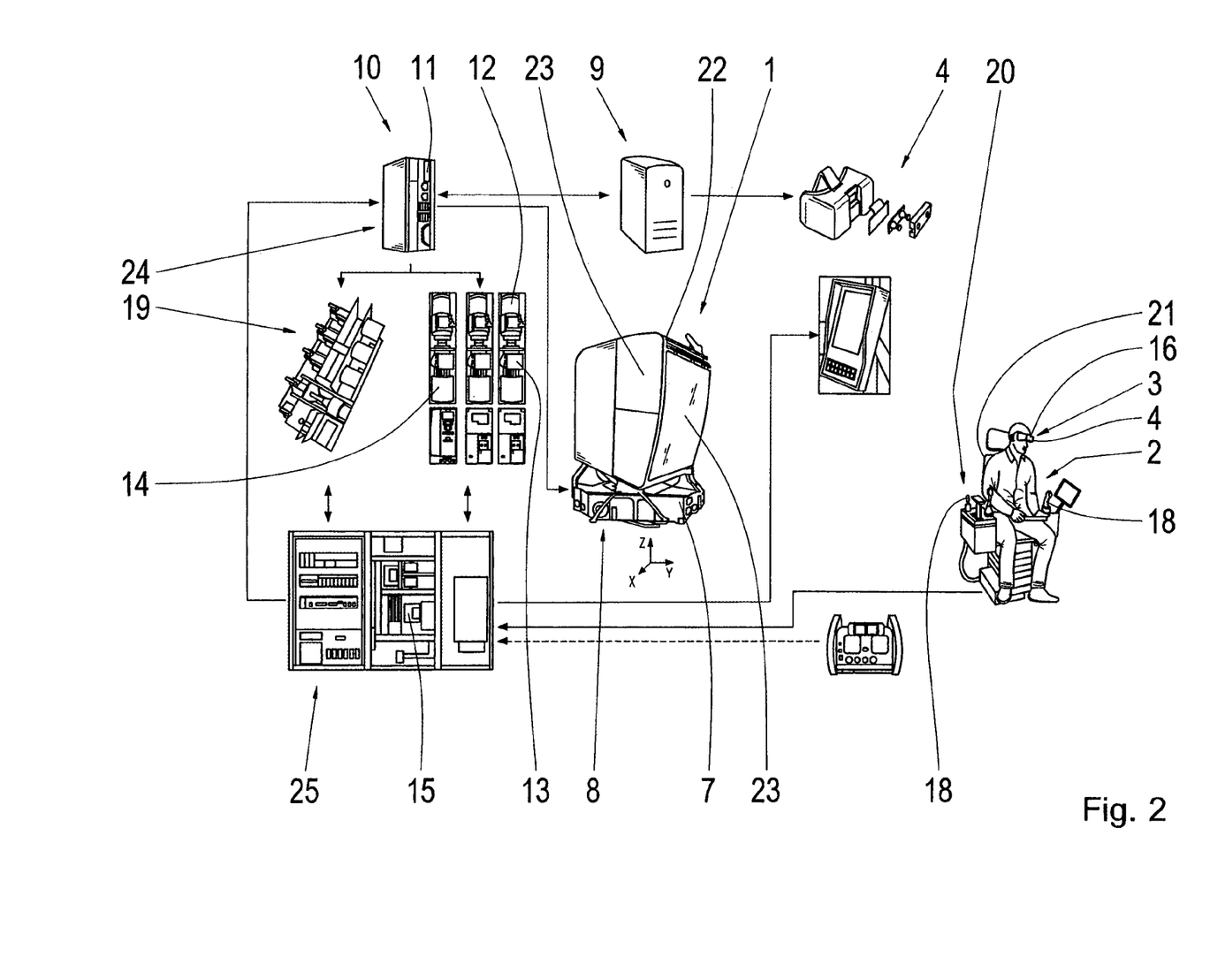
FIG. 2: a schematic representation of the components of a remote control device having a control station for the operator in accordance with an advantageous embodiment of the invention.

As FIGS. 1 and 2 show, the remote control device 1 can be configured as a crane remote control that comprises a control station 2 in the form of a crane operator's cab substantially in the form of a "real" crane operator's cab such as can be used at a crane, for example a revolving tower crane, a harbor crane, a maritime crane or a mobile telescopic crane.

The crane 200 can here be configured as a revolving tower crane whose tower 202 bears a boom 203 at which a trolley 204 is travelably supported. The boom 203 can be rotated about an upright axis together with the tower 202 or also without the tower 202—depending on the configuration of the crane as a top slewer or as a bottom slewer—for which purpose a slewing gear drive is provided. The boom 203 could optionally also be configured as being able to be luffed up and down about a horizontal transverse axis, with a suitable luffing drive being able to be provided, for example, in interaction with the boom guying. Said trolley 204 can be traveled by means of a trolley travel winch or of a different trolley travel drive.

Said control station 2 can here comprise in a manner known per se an operator's seat 21, for example in the form of an operator's chair 20, about which various input means 18 for inputting control commands are arranged. Said input means 18 can, for example, comprise a joystick, a touchscreen, control levers, input buttons and input switches, rotary regulators, sliding regulators, and similar.

The operator's position is here surrounded by an operator's station wall 22 that can correspond to a cab housing and that can have window regions 23 that are glazed in real crane operator's cabs, but are tinted in a certain color in the present case, coated with a green film, for example, to be able to impose real camera generated or virtual machine surroundings by means of green screen technology, as will be explained.

The control station 2 is installed on a movement platform 7 by means of which the control station 2 is movable in a multi-axial manner. The movement platform 7 is here advantageously configured as movable in a multi-axial manner, in particular tiltable or rotatable about three spatial axes x, y, and z, and is translatorily displaceable along these axes.

Actuators of a drive apparatus 8, for example in the form of electric motors and/or hydraulic cylinders and/or hydraulic motors, are associated with the movement axes x, y, and z of the movement platform 7 to be able to move the control station 7 about or along said axes.

The drive apparatus 8 is here controlled by a movement control apparatus 24 that can, for example, be implemented by an industrial PC.

Said movement control apparatus 24 can here in particular be part of a movement determination module 10 by means of which crane movements and/or positions and/or orientations of crane components such as of the boom or of the tower and also twisting phenomena of structural components such as of the boom or of the tower can be determined in dependence on the respective control commands input at the control station 2. Said movement determination module 10 so-to-say determines the effects of the input control commands to the crane to be controlled, i.e. which movements, positions, orientations, and twisting phenomena of the crane components would result as a consequence of input control commands at the crane to be controlled and outputs corresponding movement signals characterizing said parameters.

Said movement determination module 10 does not determine said movement parameters or does not determine them completely by calculation using a computation model, but makes use of actual hardware components in the form of drive components and control components that perform actual movements and simulate the corresponding hardware components at a real crane.

As FIG. 2 shows, the movement determination module 10 at least comprises the main components of a crane control 25 such as can be implemented in the switch cabinet of a crane. Said crane control 25 in particular comprises the frequency inverters 15 of different crane drives, for example of the slewing ear, of the trolley mechanism, and of the hoisting gear. Said crane control 25 can optionally comprise further control components and/or power electronic components, in particular load monitoring components, working region limitation components, etc.

The crane control 25 is communicationally connected to the control station 2 and to its input means 18 so that the crane control 25 can further process the input control commands, with the frequency inverters in particular controlling drive units 12, for example in the form of servo drives, in dependence on the input control commands. The control commands input at the control station 2 are therefore converted into real movements or drive torques and drive forces of the drive units 12.

Said drive units 12 are here couplable to counter-drive units 14 via which movement resistances can be applied to the drive units 12 to be able to simulate real resistances such as hoisting loads, wind forces, inertia, or dynamic loads. Said counter-drive units 14 can be controlled by the aforesaid industrial PC that also implements the movement control apparatus 24. The control of the counter-drive units 14 can here take place using different specified values or programs, for example by presettable hoisting loads, presettable wind programs, or using predefined functions or tables such as dynamic reactions on the braking of the trolley drive mechanism or of the rotational movement. Corresponding models, tables, or functions can be stored in a memory module of the control apparatus for controlling the counter-drive units 14 for this purpose.

As FIG. 2 indicates, detection devices 13, for example in the form of rotary encoders or other position sensors and/or movement sensors are associated with the drive units 12 and movement signals or position signals that characterize the adjustment movements of the drive units 12 can be provided by means of them. The movement determination module 10 therefore provides real sensor signals as movement parameters that can, on the one hand, be displayed at the control station 2, and that can, on the other hand, also be used for furthergoing simulation functions. Structural twisting phenomena such as tower deflections, boom deflections, and similar deformation can in particular be determined using a mathematical model in dependence on said movement signals that the rotary encoders provide and the drive apparatus 8 of the movement platform 7 can be controlled to move the control station 2 and the virtual representation of the crane surroundings can be generated, in each case in dependence on said sensor signals generated in reality.

As FIG. 2 shows, the movement determination module 10 can comprise a processing unit 11 that can in turn be implemented by the aforesaid industry PC and by means of which processing unit 11, in dependence on the control commands input at the control station 12 and/or on the emulated data which are generated by the data emulation device 19 or by sensor signals produced by the detection device 13 associated with the drive units 12, structural twisting phenomena are determined, in particular deflections and torsion in the crane tower and in the crane boom, with the processing unit 11 using a calculation model that takes account of the structural stiffnesses, as initially explained.

Alternatively or additionally to these emulated movement data, the movement determination can, however, also detect "real" movements and/or deformations of the remote controlled crane by means of a suitable sensor system and can transmit them by remote data transmission to the control station 2 to then control specific functions of the control station 2 of the remote control device with reference to these real crane reactions.

The movement control apparatus 24 controls the drive apparatus 8 of the movement platform 7 using said emulated and/or detected real movement data and the deformation data determined therefrom to move the control station 2 and to simulate real crane operator's cabin movements that would occur in a real crane on an input of corresponding control commands.

On the other hand, said movement data and optionally also said deformation data are used to take account of crane reactions in a virtual representation that is generated by a graphical simulation module 9 and is displayed on a display apparatus 3. Said virtual representation here in particular shows the crane surroundings and crane components visible therein such as the crane boom and the lifting hook and can substantially correspond to the image that a crane operator would see from the crane operator's cab. Said virtual representation can here correspond, in the form of a photo-like or film-like digital image, for example to a pixel representation in a plurality of colors. Alternatively, however, a simplified graphical representation can also be provided, albeit a photo-like or film-like representation image that is as realistic as possible is preferred.

Alternatively or additionally to such a virtual representation, however, a real camera generated representation of the crane surroundings and/or of the lifting hook can also be used at the control station 2. At least one camera whose live images are transmitted to the control station 2 can be installed at the crane 200 for this purpose. Such a camera 220 can, for example, be installed at the crane operator's cab 206 of the remote controlled crane 200 and can advantageously have at least approximately an axis of view that corresponds to the axis of view of a crane operator in the crane operator's cab 206 an/or that goes from the crane operator's cab 206 to the lifting hook.

Alternatively or additionally, however, different cameras and/or representations can be recorded from different perspectives and can be transmitted to the control station to be displayed there. A aerial drone 209 can in particular be used that is equipped with at least one camera and that can be moved by remote control relative to the crane 200.

To be also able to see the lifting hook 208 that can be connected to a hoist rope 207 running down from the trolley 204 or a load received thereat or the surroundings of the lifting hook 208 when the lifting hook 208 is outside the range of vision of the crane operator's cab 206 or of the crane operator, for example when—as FIG. 1 shows—the load is to be placed down behind a building, an aerial drone 209 is provided at which at least one camera 210 is installed by means of which a camera image of the lifting hook 208 and/or of the lifting hook surroundings can be provided. Said camera image is advantageously a live image or a real time image in the sense of a television image or video image and is wirelessly transmitted from the camera 210 of the aerial drone 209 to a display unit 211 and/or to the control apparatus 205 of the crane 201, with said display unit 211, for example, being able to be a machine operator display in the manner of a tablet or of a screen or of a monitor that can be installed in the crane operator's cab 206. If a remote control station or a mobile operating unit is used to control the crane 201 in the previously named manner, said display unit 211 can be provided in the remote control station or at the mobile operating unit.

The aerial drone 209 is provided with a remote control device 212 that permits the aerial drone 209 to be remote controlled, in particular the flight control units such as rotor blades to be controlled to remote control the flight position of the aerial drone 209 and/or to remote control the camera 210, in particular with respect to the panning angle or the viewing axis of the camera 210 relative to the body of the aerial drone 209 and/or the focal length of the camera 210.

A corresponding remote control module can be provided in the crane operator's cab 206 and/or in the remote control station or in the mobile operating unit and can, for example, be equipped with corresponding joysticks. To enable a simple operation however, a voice control and/or a menu control can also be provided for the aerial drone 209, for example to select a desired relative position from a plurality of predefined relative positions of the aerial drone 209 relative to the crane. This can be done, for example, in that "drone position 1" is input by voice control and/or by menu control that can be stored in a preprogrammed or predetermined manner in the position control apparatus 213.

Said real or virtual representation of the crane surroundings and of the crane components visible therein can advantageously have a live image superposed that shows real components from the control station 2, in particular components visible in the direction of view from the head of the remote control device user such as input means 18, the hands, and the lower arm of the user, and other components disposed in the field of view.

A camera 16 is advantageously provided for this purpose that can be configured as a head camera that can be worn at the head of the user and can have corresponding fastening means and/or holding means for fastening to the head, for example in the form of a helmet camera. If the display apparatus 3 is advantageously configured in the form of virtual reality glasses 4 that the user wears, the camera 16 can be integrated in these VR glasses.

The camera 16 is here advantageously configured as a stereoscopic camera to be able to provide stereoscopic images corresponding to the axes of view of both eyes of the user.

The superposition apparatus 17 for superposing the representation of the crane surroundings and of the live image of the camera 16 from the control station 2 can here in particular comprise a color-based image processing module 26 that can work in accordance with the so-called green screen technology. Said color-based image processing module 26 can in particular recognize image regions in the live image of the camera 16 that have a specific color differing from the remaining partial image areas and can then replace these images with the representation from the simulation module 9.

The control station 2 can advantageously comprise an operator's cab wall 22 for this purpose in which window regions 23—for example, corresponding to the viewing windows of a real crane operator's cab—are colored in a key color that differs as much as possible from the remaining colors of the other components disposed in the field of view of the camera such as the color of the window frames, of the input means 18, and of the operator's clothing and skin color so that the live image recorded in the control station 2 shows said colored areas in a specific color reproduction, while all the other image areas are shown in different colors. The live image areas or partial live image areas tinted in said key color—green, for example—are then replaced with the representation of the machine surroundings and/or of the machine components visible therein that is generated by the graphical simulation module 9 and/or that is generated by a camera arranged at the crane so that the superposed image or the superposed representation shows the controls station 2 of the remote control device, its components, and body members of the user located in the field of view of the live camera live as a live image, on the one hand, and shows the real or virtual representation of the machine surroundings and of the machine components visible therein in the window regions 23 of the operator's cab wall 22 taken by the live camera 16, on the other hand.

We claim:

1. A remote control device for a machine comprising at least one of a crane, a construction machine, or a pallet truck, comprising:
    a control station comprising an inputter for inputting control commands, and a signal transmission device for transmitting control commands input at the control station to a control apparatus of the crane, of the construction machine, or of the pallet truck;
    a display apparatus for displaying a representation of a piece of working equipment and/or of a surroundings about the machine; and
    a movement determination module for determining movements and/or deformations of machine components of the machine in dependence on the control commands input at the control station,
    wherein the control station is movably supported and a movement control apparatus is provided for moving the control station in dependence on the movements and/or deformations determined by the movement determination module,
    wherein the movement determination module comprises a determination device for determining deformations of structural elements of the machine to be simulated in dependence on the control commands input at the control station, and wherein the determination device comprises a processing unit for calculating the deformations with reference to a stored deformation model of the structural elements.

2. The remote control device of claim 1, wherein the control station is movably supported in a multi-axial manner, and wherein a drive apparatus has a plurality of movement axes comprising a plurality of rotational movement axes and/or a plurality of translatory movement axes that are actuable in dependence on the control commands input at the control station.

3. The remote control device of claim 2, wherein the control station is supported on a movement platform, and wherein the drive apparatus is integrated with the movement platform.

4. The remote control device of claim 1, further comprising at least one camera for providing a live image of the piece of working equipment and/or of the surroundings; and wherein the control station has at least one image receiver for receiving the live image from the at least one camera, and wherein the live image underlies the representation displayed on the display apparatus.

5. The remote control device of claim 4, wherein a remote control aerial drone comprises the at least one camera.

6. The remote control device of claim 5, further comprising a position control apparatus for controlling a position of the remote control aerial drone, wherein the position control apparatus has an automatic follow control module for controlling the remote control aerial drone in dependence on a position of the machine and/or on a position of the piece of working equipment such that the remote control aerial drone automatically follows movements of the machine and/or the piece of working equipment and maintains a desired position relative to the machine and/or the piece of working equipment during movements of the piece of working equipment.

7. The remote control device of claim 6, wherein the position control apparatus comprises an autonomous control module for autonomous remote control of the remote control aerial drone such that different desired positions relative to the machine and/or the piece of working equipment are flyable to by the remote control aerial drone.

8. The remote control device of claim 4, wherein the at least one camera is provided at the crane, at the construction machine, or at the pallet truck with a direction of view at least approximately toward the piece of working equipment or wherein the at least one camera is provided at an operator's cab of the crane, of the construction machine, or of the pallet truck with a direction of view at least approximately toward the piece of working equipment.

9. The remote control device of claim 1, further comprising:
    at least one camera for detecting live images at the control station; and
    a superposition device associated with the display apparatus, said superposition device being provided to superpose the representation of the surroundings and/or of the piece of working equipment with the live images detected by the at least one camera on the display apparatus.

10. The remote control device of claim 9, wherein the at least one camera has a head holder for wearing the at least one camera on the head of a remote control device user and/or is configured as a head camera and/or helmet camera.

11. The remote control device of claim 9, wherein the at least one camera is configured as a stereoscopic camera for providing stereoscopic images at least approximately in a direction of view toward a remote control device user.

12. The remote control device of claim 1, wherein the display apparatus has a head holder for wearing on the head of a remote control device user and/or is configured as display glasses comprising virtual reality glasses with an integrated camera.

13. The remote control device of claim 1, further comprising a graphical simulation module for calculating a virtual representation of the surroundings and/or of machine components visible from the control station, and wherein the graphical simulation module comprises a data interface for importing structure data and/or construction site data and comprises an image processing device for generating and/or adapting the virtual representation of the surroundings in dependence on the imported construction site data and/or structure data.

14. The remote control device of claim 1, wherein a graphical simulation module is configured for generating a virtual representation of the surroundings and/or of machine components in dependence on the calculated deformations of the structural elements and/or wherein the movement control apparatus is configured for controlling a drive apparatus in dependence on the calculated deformations of the structural elements.

15. A system comprising:
the remote control device of claim 1;
a crane; a construction machine; or a pallet truck; and
wherein the crane, the construction machine and/or the pallet truck have a communication connection with the remote control device through which the control commands input at the control station of the remote control device are transmittable to the control apparatus of the crane, of the construction machine and/or of the pallet truck.

16. A remote control device for a machine comprising at least one of a crane, a construction machine, or a pallet truck, comprising:
a control station comprising an inputter for inputting control commands, and a signal transmission device for transmitting control commands input at the control station to a control apparatus of the crane, of the construction machine, or of the pallet truck;
a display apparatus for displaying a representation of a piece of working equipment and/or of a surroundings about the machine; and
a movement determination module for determining movements and/or deformations of machine components of the machine in dependence on the control commands input at the control station,
wherein the control station is movably supported and a movement control apparatus is provided for moving the control station in dependence on the movements and/or deformations determined by the movement determination module,
wherein the control station comprises an operator's cab wall in which viewing windows are formed, wherein the viewing windows are tinted in a certain color,
wherein the remote control device further comprises a camera, a graphical simulation module and/or a superposition device, and wherein the graphical simulation module and/or the superposition device has a color-sensitive overlay device for overlaying the representation of the surroundings in image areas of a live image provided by the camera that are tinted in the certain color.

17. The device of claim 1, further comprising A remote control device for a machine comprising at least one of a crane, a construction machine, or a pallet truck, comprising:
a control station comprising an inputter for inputting control commands, and a signal transmission device for transmitting control commands input at the control station to a control apparatus of the crane, of the construction machine, or of the pallet truck;
a display apparatus for displaying a representation of a piece of working equipment and/or of a surroundings about the machine;
a movement determination module for determining movements and/or deformations of machine components of the machine in dependence on the control commands input at the control station, wherein the control station is movably supported and a movement control apparatus is provided for moving the control station in dependence on the movements and/or deformations determined by the movement determination module; and
a configuration module for a selective preconfiguration of the remote control device for one of a plurality of machine types, wherein the configuration module is for adapting the inputter of the control station to a selected machine type and/or a configuration module for adapting parameters of the movement determination module to the respective selected machine type.

18. The remote control device of claim 17, further comprising a graphical simulation module for calculating a virtual representation of the surroundings and/or of machine components visible from the control station, and wherein the graphical simulation module comprises a data interface for importing structure data and/or construction site data and comprises an image processing device for generating and/or adapting the virtual representation of the surroundings in dependence on the imported construction site data and/or structure data.

19. A remote control device for a machine comprising at least one of a crane, a construction machine, or a pallet truck, comprising:
a control station comprising an inputter for inputting control commands, and a signal transmission device for transmitting control commands input at the control station to a control apparatus of the crane, of the construction machine, or of the pallet truck;
a display apparatus for displaying a representation of a piece of working equipment and/or of a surroundings about the machine;
a movement determination module for determining movements and/or deformations of machine components of the machine in dependence on the control commands input at the control station, wherein the control station is movably supported and a movement control apparatus is provided for moving the control station in dependence on the movements and/or deformations determined by the movement determination module; and
a graphical simulation module for calculating a virtual representation of the surroundings and/or of machine components visible from the control station, and wherein the graphical simulation module comprises a data interface for importing structure data and/or construction site data and comprises an image processing device for generating and/or adapting the virtual representation of the surroundings in dependence on the imported construction site data and/or structure data, wherein the data interface comprises a CAD interface and the image processing device is configured for generating and/or adapting the virtual representation of the surroundings in dependence on the CAD data imported via the CAD interface and/or is an image data interface and the image processing device is configured for generating and/or adapting the virtual representation of the surroundings in dependence on image data comprising digital image data imported via the image data interface.

20. A remote control device for a machine comprising at least one of a crane, a construction machine, or a pallet truck, comprising:
- a control station comprising an inputter for inputting control commands, and a signal transmission device for transmitting control commands input at the control station to a control apparatus of the crane, of the construction machine, or of the pallet truck;
- a display apparatus for displaying a representation of a piece of working equipment and/or of a surroundings about the machine;
- a movement determination module for determining movements and/or deformations of machine components of the machine in dependence on the control commands input at the control station, wherein the control station is movably supported and a movement control apparatus is provided for moving the control station in dependence on the movements and/or deformations determined by the movement determination module; and
- a graphical simulation module for calculating a virtual representation of the surroundings and/or of machine components visible from the control station, and wherein the graphical simulation module comprises a data interface for importing structure data and/or construction site data and comprises an image processing device for generating and/or adapting the virtual representation of the surroundings in dependence on the imported construction site data and/or structure data, wherein the graphical simulation module is configured for calculating the virtual representation in dependence on the movements and/or deformations determined by the movement determination module.

* * * * *